United States Patent [19]

Pezzarossi

[11] Patent Number: 4,628,962

[45] Date of Patent: Dec. 16, 1986

[54] TUB-SHOWER DIVERTER VALVE

[75] Inventor: John J. Pezzarossi, Abilene, Tex.

[73] Assignee: United States Brass Corporation, Plano, Tex.

[21] Appl. No.: 816,555

[22] Filed: Jan. 6, 1986

[51] Int. Cl.[4] .......................................... F16K 11/085
[52] U.S. Cl. .............................. 137/625.47; 137/597; 137/876; 251/310; 251/314
[58] Field of Search .................... 137/625.46, 625.47, 137/876, 874, 597, 625.15, 625.16, 625.24; 251/314, 309, 310

[56] References Cited

U.S. PATENT DOCUMENTS

| | | | |
|---|---|---|---|
| 1,856,380 | 5/1932 | Foster | 137/597 |
| 2,031,932 | 2/1936 | Cornell, Jr. | 137/597 |
| 2,847,027 | 8/1958 | Kumpman | 136/597 |
| 2,862,520 | 12/1958 | Cordova | 137/597 X |
| 2,906,293 | 9/1959 | Fraser et al. | 137/597 X |
| 4,494,730 | 1/1985 | George | 251/314 X |

Primary Examiner—Martin P. Schwadron
Assistant Examiner—John S. Starsiak, Jr.
Attorney, Agent, or Firm—Wm. T. Wofford; James C. Fails; Arthur F. Zobal

[57] ABSTRACT

A tub-shower diverter valve of the type having a valve body with a cylindrical cavity having inlet and outlet openings and a valve stem having a cylindrical rotatable core portion is provided a seal sleeve made of elastomeric material and incorporating a metal insert. The seal sleeve further incorporates ribs integral with its interior surface and surrounding each of the two seal sleeve outlet openings. The rotatable core portion is provided a bleed opening in a rear end wall.

10 Claims, 10 Drawing Figures

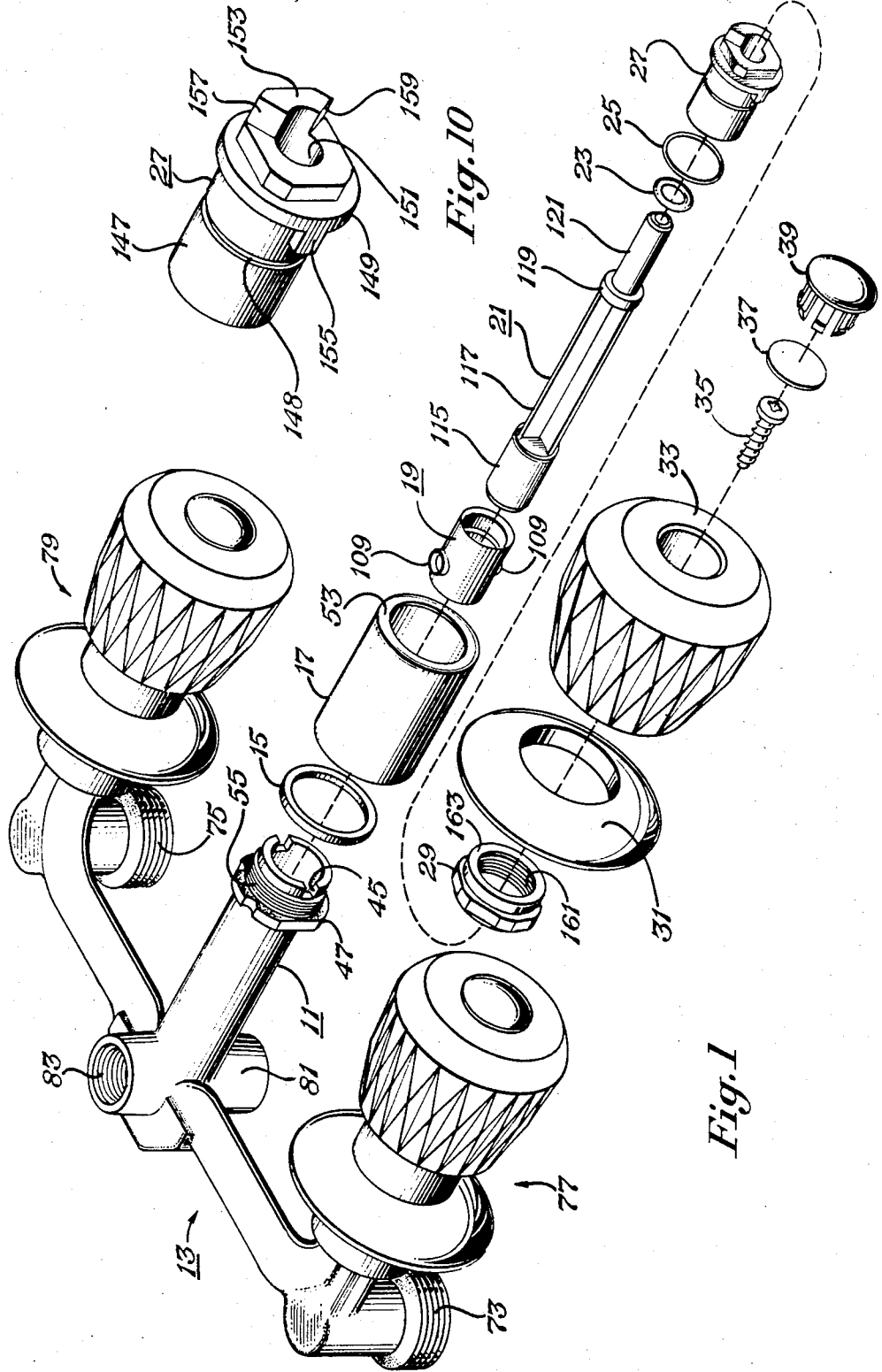

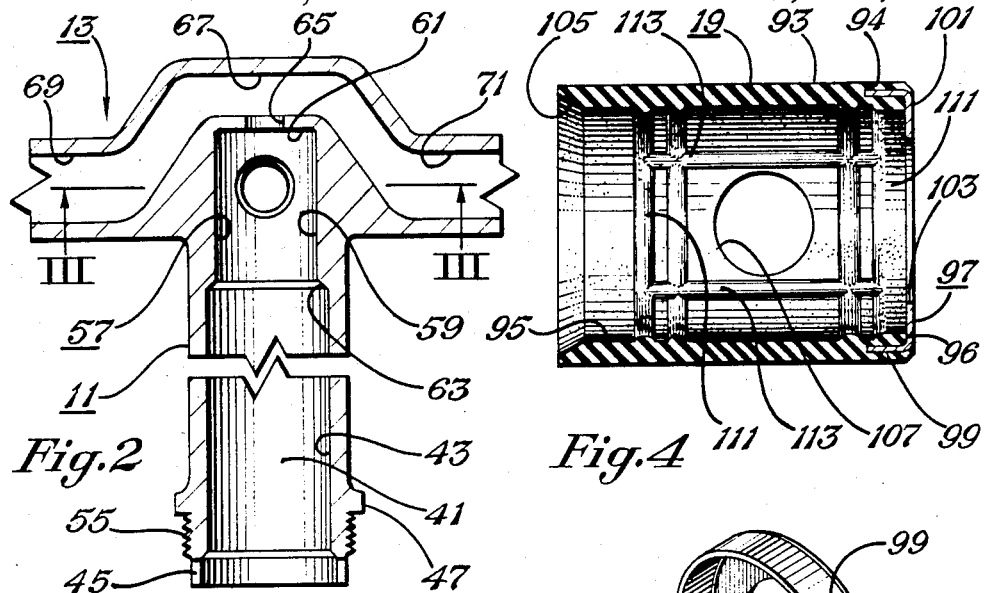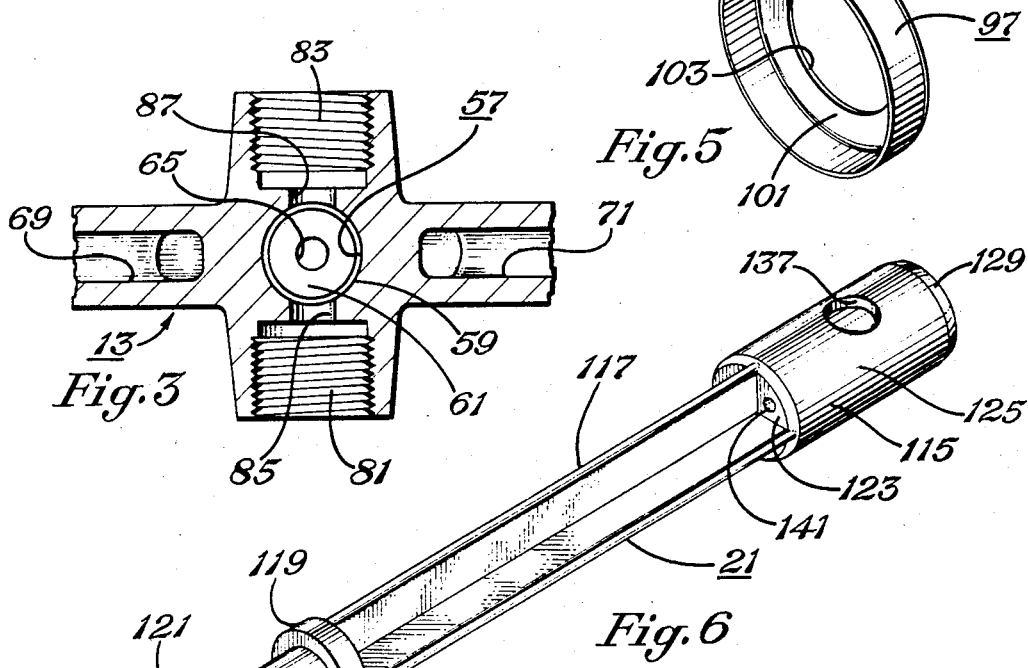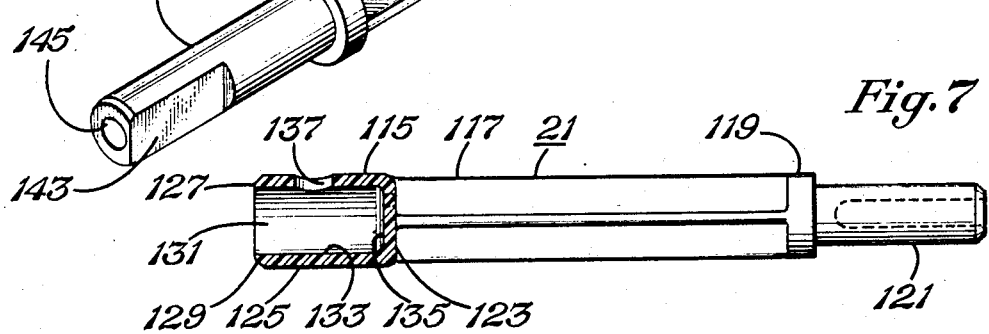

TUB-SHOWER DIVERTER VALVE

FIELD OF INVENTION

The invention relates to diverter valves of the type used for selecting water flow direction in bathtub-shower applications.

BACKGROUND OF THE INVENTION

One type of tub-shower diverter valve of the prior art of which I am aware utilizes a valve body having a cylindrical cavity which cooperates with the rotatable core portion of a valve stem to accomplish the valving action. The water inlet opening is at the rear end of the cylindrical cavity, and the rotatable core is received in the front end. Suitable means integral with the rotatable core portion extends axially thereof, and is fitted at its outer end portion with an operating handle. The valve body has oppositely disposed tub and shower outlet openings merging with the cylindrical cavity. The rotatable core can be positioned to permit water flow out the tub outlet while preventing flow out the shower outlet, or vice-versa.

Tub-shower diverter valves of the type above mentioned in the prior art of which I am aware are subject to a number of disadvantages. The rotatable core may have associated with it rubber seal means that can be partially distended by the water pressure into the outlet opening being sealed, so that extra torqueing force is required to move the rotatable core, and also the useful life of the rubber seal means is shortened. Rubber seal means associated with the rotatable core may also be extruded or displaced by the water pressure, so as to become ineffective. The rotatable core may be made of plastic material with no rubber seal means involved, in which case it is inevitable that some leakage will occur at the valve body outlet opening that is supposed to be closed.

It is the objective of this invention to provide an improved tub-shower diverter valve that is not subject to the above-mentioned disadvantages.

BRIEF DESCRIPTION OF DRAWINGS

FIG. 1 is an exploded isometric view showing a tub-shower valve arrangement which includes a tub-shower diverter valve in accordance with a preferred embodiment of the invention.

FIG. 2 is a schematic fragmentary horizontal section view showing the central portion of the tub-shower valve arrangement manifold and the tub-shower diverter valve body portion.

FIG. 3 is a schematic fragmentary vertical section view taken at lines 3—3 of FIG. 2.

FIG. 4 is a schematic horizontal section view of the seal sleeve of FIG. 1.

FIG. 5 is a schematic isometric view showing the metal insert portion of the seal sleeve of FIG. 4.

FIG. 6 is a schematic isometric view showing the rotatable core portion and integral stem of the diverter valve of FIG. 1.

FIG. 7 is a schematic side elevational view of the device section of FIG. 6, with the rotatable core portion sectioned.

FIG. 10 is a schematic isometric view of the retainer part of the tub-shower diverter valve of FIG. 1.

DESCRIPTION OF PREFERRED EMBODIMENTS

Figure 8:
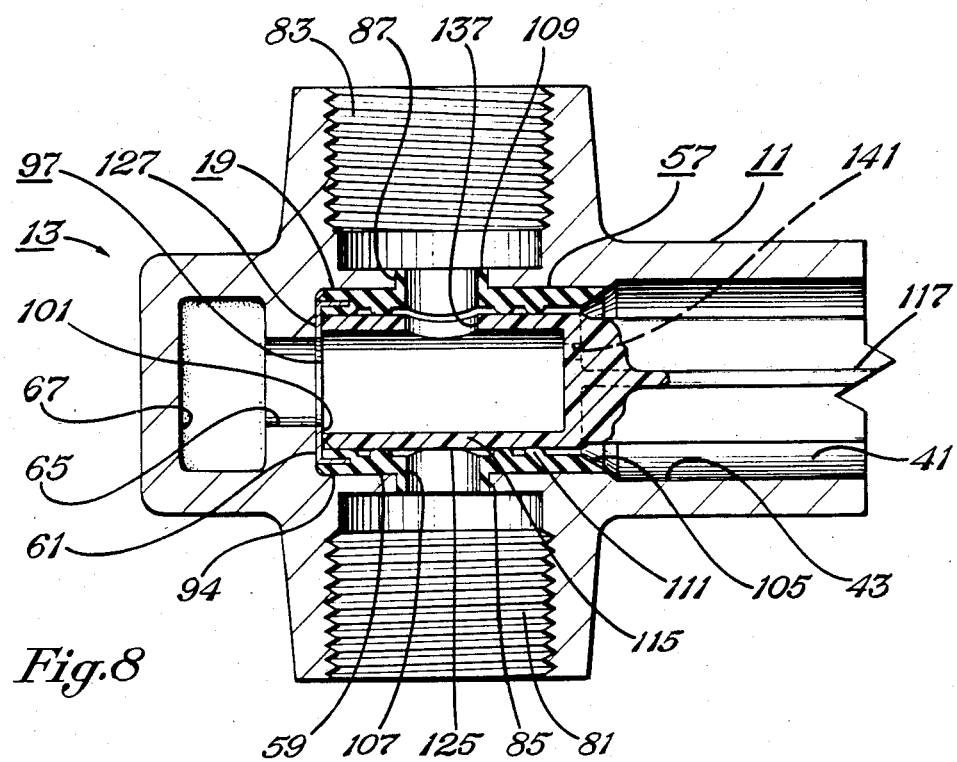
FIG. 8 is an enlarged schematic fragmentary vertical section view of the manifold and diverter valve body portion taken in the plane containing the longitudinal axes of the valve body portion tub and shower outlets and the rotatable core portion, and showing the rotatable core portion and seal sleeve installed within the valve body portion.

The tub-shower valve arrangement as shown in FIG. 1 includes a manifold 13 fitted with respective separate control valves 77, 79 for the hot water supply 73 and the cold water supply 75. Two outlets, one of which is a tub outlet 81, the other being a shower outlet 83, emerge from the central portion of the manifold 13. Incorporated into the manifold 13 is a tub-shower diverter valve that includes a valve body 11 which is but one portion of the manifold, a gasket 15, a trim sleeve 17, a seal sleeve 19, a stem 21, a stem o-ring 23, a retainer o-ring 25, a retainer 27, a bonnet nut 29, an escutcheon 31, a handle 33, a handle retainer screw 35, a decorative button 37, and a handle plug 39.

The valve body 11 is cylindrical as it emerges outwardly from the manifold 13 and has a central bore 41 at its outer end region for receiving various valve parts. The central bore 41 is of cylindrical shape having an inner end, an outer end, and a side wall 43 (see FIG. 2). Opposing rectangular slots 45, for receiving tabs 155 on the retainer 27, are disposed within the side wall 43 at the outer end of the central bore 41. A flange 47 rings the outer circumference of the valve body 11 near the open end. The trim sleeve 17 fits over the valve body 11 and the flange 47; an inwardly extending flanged portion 53 of the trim sleeve stops rearward axial displacement of the trim sleeve 17 at the valve body flange 47. External threads 55 formed outwardly of the flange 47 and inwardly of the rectangular slots 45 matingly engage internal threads 161 of the bonnet nut 29. At the inward end of the central bore 41 lies a cylindrical cavity 57 having a side wall 59 of less diameter than that of the central bore 41, a rear end wall 61, and an open front end. The front portion of the cylindrical cavity side wall 59 merges with a chamfered edge 63 which in turn merges with the side wall 43 of the central bore 41. An inlet opening 65 in the rear end wall 61 allows communication between a mixing chamber 67 and the cylindrical cavity 57. Hot and cold water is supplied to the mixing chamber 67 through hot and cold water passages 69, 71 in the manifold 13. The hot water supply 73 and the cold water supply 75, controlled by respective hot and cold water control valves 77, 79, provide water to the hot and cold water passages 69, 71. The cylindrical cavity 57 communicates with tub and shower outlets 81, 83 through oppositely disposed tub outlet and shower outlet openings 85, 87 (see FIG. 3). The central axes of the tub and shower outlet openings 85, 87 are common and normal to the central axes of the valve body 11 and of the cylindrical cavity 57. The outlets 81, 83 are internally threaded for the receipt of risers (not shown) connected to tub and shower outlets.

Referring to FIG. 4, the seal sleeve 19 has cylindrical exterior and interior surfaces 93, 95, an open front end portion for receiving the cylindrical rotatable core portion 15 of the stem 21, and a rear end portion 94 which is bonded to a metal insert 97. The rear end portion 94 of the seal sleeve 19 includes a ring-shaped rear end surface 96. The metal insert 97, illustrated in FIG. 5, has the shape of a shallow cup with a side wall flange 99 and a bottom wall 101. A circular opening 103 is centrally disposed in the bottom wall 101. The seal sleeve 19, absent the metal insert of course, is made of an elastomeric material, typically molded rubber. Incorporation of the metal insert 97 into the rear end portion 94 of the seal sleeve 19 is achieved by chemically bonding the rubber to the metal insert during the molding process of the rubber such that the seal sleeve rear end portion 94 completely encapsulates the cup side wall flange 99 and the seal sleeve rear end surface 96 abuts the cup bottom wall 101. Once molded, the outside diameter of the seal sleeve 19 is such as to provide an interference fit with the cylindrical cavity 57 as will be hereinafter more fully explained. The interior surface 95 of the seal sleeve 19 merges with a chamfered edge 105 at the front end portion of the seal sleeve 19 that serves to ease insertion of the cylindrical rotatable core portion 115 of the stem 21 into the seal sleeve 19.

Figure 9:
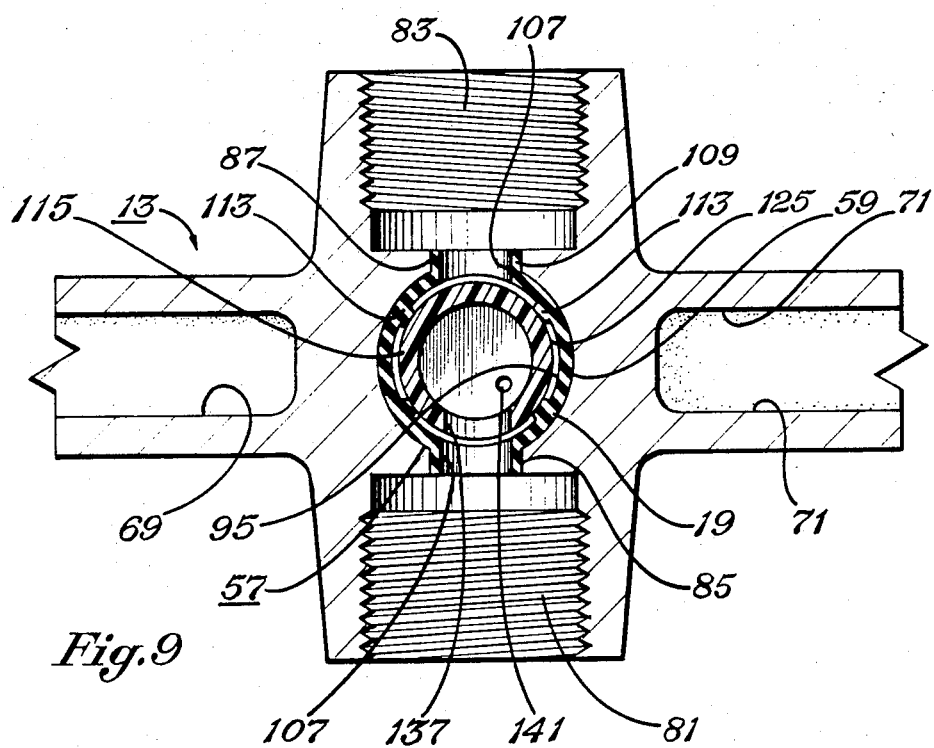
FIG. 9 is an enlarged schematic fragmentary vertical section view like FIG. 8, but taken in a plane that is perpendicular to that of FIG. 8, and as viewed from the rear.

Oppositely disposed outlet openings 107 penetrate the seal sleeve 19 in such a manner as to be aligned with the valve body outlet openings 85, 87 when the seal sleeve 19 is properly installed. Each outlet opening 107 is surrounded by a cylindrical flange 109 protruding radially outward from the exterior surface 93 for a short distance. Once the seal sleeve 19 is installed, these flanges 109 protrude into the valve body outlet openings 85, 87, as shown in FIGS. 8 and 9. A set of circumferential ribs 111, integral to the interior surface 95, are on the inward side of the seal sleeve outlet openings 107, with another set of circumferential ribs on the outward side. Longitudinal ribs 113, also integral to the interior surface 95, are formed at approximate 90° intervals between the outlet openings 107 and extend between the innermost and the outermost circumferential ribs 111. The resulting rib pattern frames each outlet opening 107 by a pair of longitudinal ribs 113 and the two centermost circumferential ribs 111. The ribs 111, 113 provide both sealing advantages and torqueing advantages as will be explained in further detail below.

The stem 21, illustrated in FIGS. 6 and 7, has a cylindrical rotatable core portion 115, a connector portion 117, a flange 119, and a retainer and handle receiver portion 121, all integrally formed together. The cylindrical rotatable core portion 115 has a front end surface 123, a cylindrical peripheral surface 125, and a rear end surface 127. The cylindrical peripheral surface 125 merges with a chamfered edge 129 which in turn merges with the rear end surface 127. The chamfered edge 129 eases insertion of the cylindrical rotatable core portion 115 into the seal sleeve 19. An internal opening having the shape of an axially extending cylindrical bore 131 is disposed within the cylindrical rotatable core portion 115. The cylindrical bore 131 has a side wall 133, a front end wall 135, and an open rear end. At the open rear end, the side wall 133 merges with the rear end surface 127. Communication between the cylindrical bore 131 and one of the valve body outlets 81, 83 occurs via a circular opening 137 in the side wall 133, which may be aligned with either one of the seal sleeve outlet openings 107 once the stem is installed. The connector portion 117, consisting of radially extending connector ribs disposed 90° from each other, extends from the front end surface 123 in a forward axial direction. A small bleed opening 141 allows communication between the cylindrical bore 131 and a portion of the front end surface 123 between two connector ribs. The forward end of the connector ribs terminates in a flange 119. The retainer and handle receiver portion 121 extends axially from the flange 119, and receives the stem o-ring 23. The flange 119 forms a shoulder which acts together with a similar shoulder inside of the retainer 27 to confine the stem o-ring 23. The retainer and handle receiver portion 121 is of generally cylindrical shape and has a flat portion 143 at the outward end. The handle 33 is provided an opening (not shown) which is matingly received by the retainer and handle receiver portion 121. A circular bore 145 extends axially from the outward end of the retainer and handle receiver portion 121 towards the flange 119 and receives the handle screw 35.

The retainer 27 (see FIG. 10) is of a conventional type having a cylindrical portion 147 that fits into the central bore 41 of the valve body 11, a flange 149 for abutting the open end of the valve body, a cylindrical opening 151 for receiving the retainer and handle receiver portion 121 of the stem 21, and a stop portion 153. Two small tabs 155 protrude inward from the flange 149 along the outer surface of the cylindrical portion 147 for engaging the two rectangular slots 45 in the valve body 11. These tabs 155 prevent rotation of the retainer 27 whenever the stem 21 is rotated, and thus keep the stop portion 153 in the desired position. The stop portion 153 has a top face 157 and a bottom face 159, each of which will abut a stop wedge, provided inside the handle 33, when the handle is rotated to its maximum extent in a respective direction. A circumferential groove 148 receives the retainer o-ring 25 which engages the side wall 43 of the central bore 41. Inside the retainer cylindrical portion 147, near the cylindrical opening 151, is the shoulder described above regarding confinement of the stem o-ring 23.

The bonnet nut 29 has internal threads 161 for matingly engaging the external threads 55 of the valve body 11. An internal shoulder formed by an inwardly extending flange 163 abuts the retainer flange 149. When the bonnet nut 29 is assembled onto the valve body 11, the retainer flange 149 is held in place against the valve body 11 by the internal shoulder of the bonnet nut 29.

To assemble the tub-shower diverter valve of FIG. 1, the seal sleeve 19 is inserted, metal insert end first, into the valve body 11 through the open outward end, and into the cylindrical cavity 57 such that each of the circular flanges 109 protrude into one of the outlet openings 85, 87 as illustrated in FIGS. 8 and 9. The circular flanges 109 assist in the alignment of the seal sleeve outlet openings 107 with the valve body outlet openings 85, 87. Once installed, the bottom wall 101 of the metal insert 97 abuts the rear end wall 61 of the cylindrical cavity 57 and an interference fit is formed between the rear end portion 94 of the seal sleeve 19 and the side wall 59 of the cylindrical cavity 57 for the length of the side wall flange 99 of the metal insert. The cylindrical rotatable core portion 115 of the stem 21, with the stem o-ring 23 assembled onto the retainer and handle receiver portion 121, is inserted into the seal sleeve 19 such that the rear end surface 127 of the stem is adjacent to the bottom wall 101 of the metal insert 97. The retainer 27 is placed in the open end of the valve body 11, with the retainer o-ring 25 assembled in circumferential groove 148, such that the retainer and handle receiver portion 121 of the stem 21 protrudes from the circular opening 151 and the tabs 155 fit into the rectangular slots 45. The bonnet nut 29 is then assembled onto the valve body 11, the gasket 15 and trim sleeve 17 are placed over the valve body, the escutcheon 31 is pushed onto the trim sleeve, and the handle 33 is mounted onto the stem and is retained by the screw 35. Finally, the decorative button 37 is pushed into the handle plug 39, which in turn is pushed into the handle 33.

The stop portion 153 on the retainer 27 prevents the handle 33 from being fully rotated. In use, when the stop wedge of the handle is against the top face 157 of the stop portion 153, the circular opening 137 of the stem 21 is aligned with the tub outlet opening of the seal sleeve 19. Water arrives at the mixing chamber 67 (see FIGS. 8, 9) via hot and cold water passages 69, 71, flows through the inlet opening 65 of the valve body, through the circular opening 103 in the metal insert 97 and into the cylindrical bore 131 of the stem. The water then flows out through the stem circular opening 137, through the respective outlet opening 107 in the seal sleeve 19 and on into the tub riser (not shown). Whenever water flow is desired through the shower outlet, the handle 33 is rotated until the stop wedge contacts the bottom face 159 of the stop portion 153.

A tub-shower diverter valve made in accordance with the present invention obviates the disadvantages hereinabove mentioned regarding the tub-shower diverter valves of the prior art.

An important aspect of the present invention is the provision of the seal sleeve 19 incorporating a metal insert 97 as hereinabove described. The rigidity provided by the metal insert together with the interference fit between the seal sleeve 19 and the cylindrical cavity sidewall 59 results in significant advantages. The seal sleeve 19 will not be extruded or displaced by water pressure, and will not be displaced by movement of the valve stem rotatable core portion 115. Extrusion or displacement of the seal sleeve 19 would of course tend to destroy its effectiveness.

Another aspect of the present invention involves the reduction of torqueing requirements for turning the valve stem 21. This reduction is accomplished partly by the provision of ribs 111, 113, which are integral with the interior surface 95 of the seal sleeve 19, and partly by the provision of the bleed opening 141 in the front end wall 135 of the valve stem cylindrical rotatable core portion 115. The two sets of ribs 111, 113 reduce the contact area between the cylindrical peripheral surface 125 of the stem rotatable core portion 115 and the interior surface 95 of the seal sleeve 19 and consequently reduce the frictional resistance. The bleed opening 141 allows water from the cylindrical bore 131 to flow into the central bore 41 of the valve body 11. This equalizes the pressure on both sides of the front wall 135 of the cylindrical rotatable core portion 115, reducing the force exerted by the face of the flange 119 on the stem o-ring 23 and thus reducing the friction between the face of the flange 119 and the stem o-ring 23. Torqueing requirements are further reduced by the fact that the seal sleeve 19 is stationary and its exterior surface 93 is matingly received by the cylindrical cavity 57, so that water pressure acting through the rotatable core circular opening 137 on the seal sleeve interior surface 95 as the stem rotatable core portion 115 is moved cannot cause any friction increasing distortion of the seal sleeve 19.

Another aspect of the present invention involves the sealing function of the ribs 111, 113. The sealing of one seal sleeve outlet opening 107 off from the other is accomplished by the function of the ribs 111, 113. Each opening 107 on the seal sleeve interior side is framed by ribs 111, 113 which act as a square o-ring type seal completely surrounding each opening 107. Pressure exerted due to the compression of the ribs 111, 113 by the cylindrical peripheral surface 125 of the rotatable core portion 115 is transmitted to the seal sleeve exterior surface 93 opposite the ribs 111, 113 so as to produce an effective seal between the seal sleeve exterior surface 93 and the cylindrical cavity sidewall 59 and surrounding each seal sleeve outlet opening 107. Thus, if the position of the valve stem opening 137 corresponds to the shower position, not only do the ribs 111, 113 function to seal water in around the shower outlet 83 but they also function to seal water out from the tub outlet 81.

The foregoing disclosure and the showings made in the drawings are merely illustrative of the principles of the invention and are not to be interpreted in a limiting sense.

I claim:

1. In a tub-shower valve arrangement including a tub-shower diverter valve of the type utilizing a valve body having a cylindrical cavity which has a side wall and a rear end wall and an open front end and which cooperates with a valve stem cylindrical rotatable core portion, with the valve body having an inlet opening in said cylindrical cavity rear end wall and oppositely disposed tub and shower outlet openings merging with the cylindrical cavity side wall, and with said cylindrical rotatable core portion having a front end surface, a rear end surface and an internal opening communicating at all times with said valve body inlet opening and selectively with said valve body tub or shower outlet opening, the improvement comprising:
   a. a seal sleeve made of elastomeric material and incorporating a metal insert;
      i. said seal sleeve having cylindrical interior and exterior surfaces, an open front end portion and a rear end portion including a ring-shaped rear end surface;
      ii. said metal insert having the shape of a shallow cup with a side wall flange portion and a bottom portion having a central opening;
      iii. the side wall flange portion of said metal insert being imbedded in and bonded to the rear end portion of said seal sleeve with the bottom portion of the metal insert substantially abutting the seal sleeve rear end surface;
      iv. said seal sleeve being matingly received by said cylindrical rotatable core portion with said metal insert adjacent said core portion rear end surface, and said seal sleeve having oppositely disposed outlet openings that are aligned with said valve body outlet openings,
      v. said seal sleeve including said metal insert being sized so as to produce an interference fit between said seal sleeve at its metal insert end portion and said valve body cylindrical cavity, so that rotation of said rotatable core portion will not cause rotation of said seal sleeve.

2. The device of claim 1 wherein there is provided a bleed opening communicating between said rotatable core portion internal opening and said front end surface.

3. The device of claim 1 wherein said rotatable core portion internal opening is an axially extending cylindrical bore having a side wall with a circular opening, an open front end, and a rear end wall, and wherein said rear end wall is provided a bleed opening.

4. The device of claim 1 wherein said seal sleeve is provided circumferential and longitudinal rib means integral with said seal sleeve cylindrical interior surface and protruding radially inwardly therefrom, with said rib means being disposed to surround both of said seal sleeve outlet openings.

5. The device of claim 3 wherein the seal sleeve is provided circumferential and longitudinal rib means integral with said seal sleeve cylindrical interior surface and protruding radially inwardly therefrom with said rib means being disposed to surround both of said seal sleeve outlet openings.

6. In a tub-shower valve arrangement including a tub-shower diverter valve of the type utilizing a valve body having a cylindrical cavity which has a side wall and a rear end wall and an open front end and which cooperates with a valve stem cylindrical rotatable core portion, with the valve body having an inlet opening in said cylindrical cavity rear end wall and oppositely disposed tub and shower outlet openings merging with the cylindrical cavity side wall, and with said cylindrical rotatable core portion having a front end surface, a rear end surface and an internal opening communicating at all times with said valve body inlet opening and selectively with said valve body tub or shower outlet opening, the improvement comprising:
 a. a seal sleeve made of elastomeric material and incorporating a metal insert;
  i. said seal sleeve having cylindrical interior and exterior surfaces, an open front end portion and a rear end portion including a ring-shaped rear end surface;
  ii. said metal insert being imbedded in and bonded to the rear end portion of said seal sleeve;
  iii. said seal sleeve being matingly received by said cylindrical rotatable core portion with said metal insert adjacent said core portion rear end surface, and said seal sleeve having oppositely disposed outlet openings that are aligned with said valve body outlet openings,
  iv. said seal sleeve including said metal insert being sized so as to produce an interference fit between said seal sleeve at its metal insert end portion and said valve body cylindrical cavity, so that rotation of said rotatable core portion will not cause rotation of said seal sleeve.

7. The device of claim 6 wherein there is provided a bleed opening communicating between said rotatable core portion internal opening and said front end surface.

8. The device of claim 6 wherein said rotatable core portion internal opening is an axially extending cylindrical bore having a side wall with a circular opening, an open front end, and a rear end wall, and wherein said rear end wall is provided a bleed opening.

9. The device of claim 6 wherein said seal sleeve is provided circumferential and longitudinal rib means integral with said seal sleeve cylindrical interior surface and protruding radially inwardly therefrom, with said rib means being disposed to surround both of said seal sleeve outlet openings.

10. The device of claim 8 wherein the seal sleeve is provided circumferential and longitudinal rib means integral with said seal sleeve cylindrical interior surface and protruding radially inwardly therefrom with said rib means being disposed to surround both of said seal sleeve outlet openings.

* * * * *